April 18, 1939.  A. R. METZGER  2,154,691
METHOD OF MAKING CONTAINERS
Filed Feb. 15, 1934  5 Sheets-Sheet 1

Inventor
Alfred R. Metzger
By Howard Fischer
Attorney

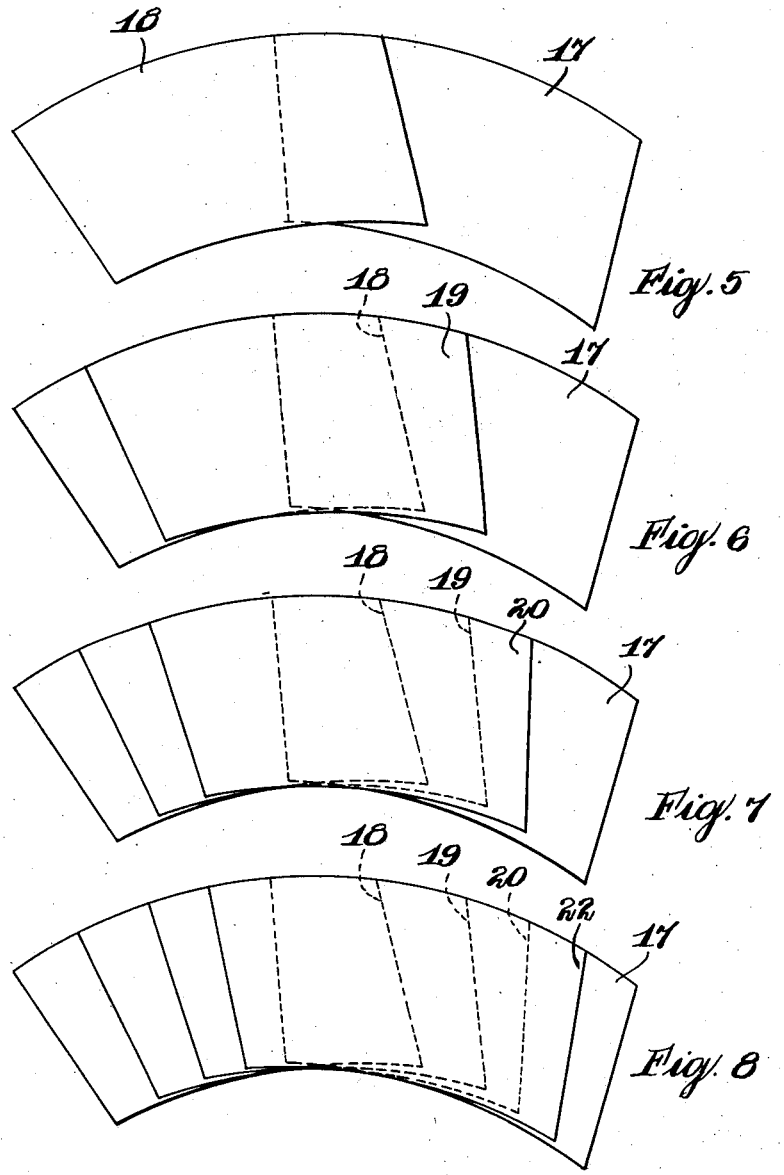

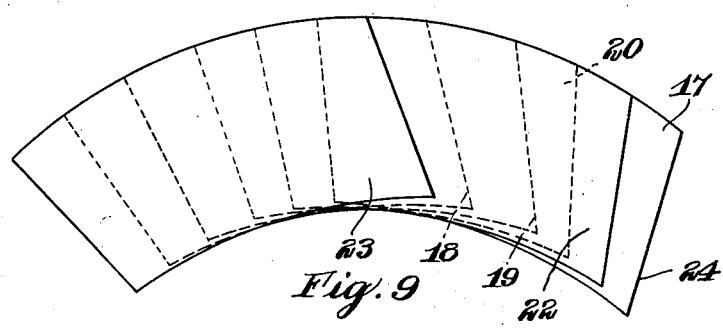
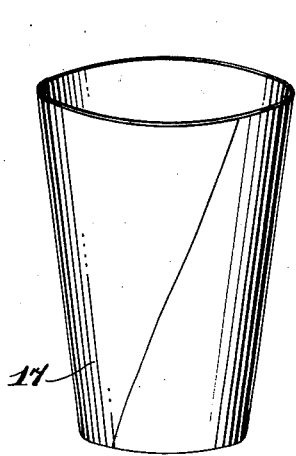
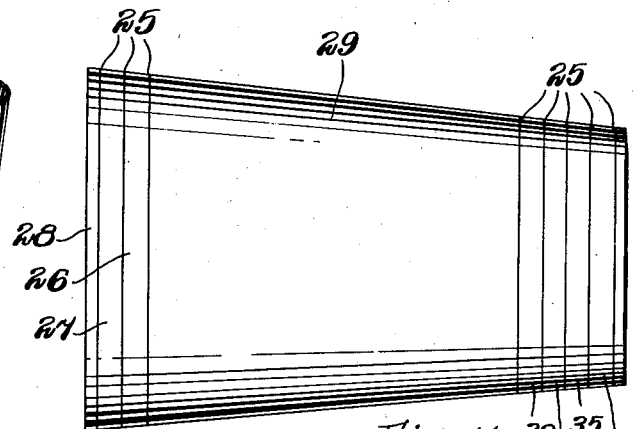
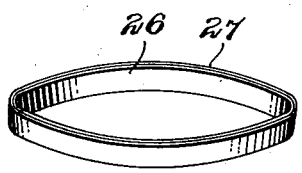
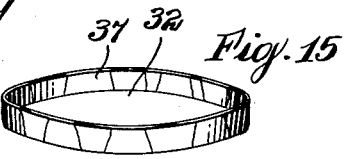
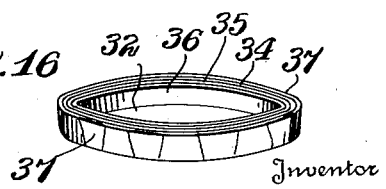

April 18, 1939.  A. R. METZGER  2,154,691
METHOD OF MAKING CONTAINERS
Filed Feb. 15, 1934  5 Sheets-Sheet 4
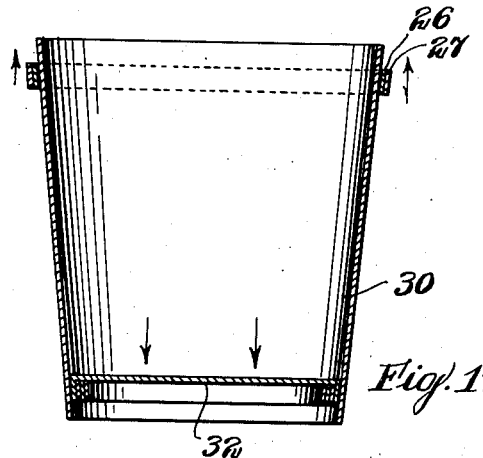
Fig. 17
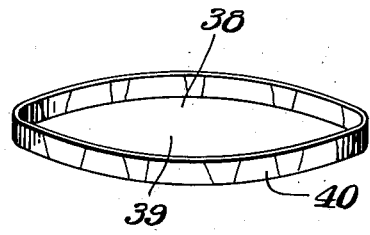
Fig. 18
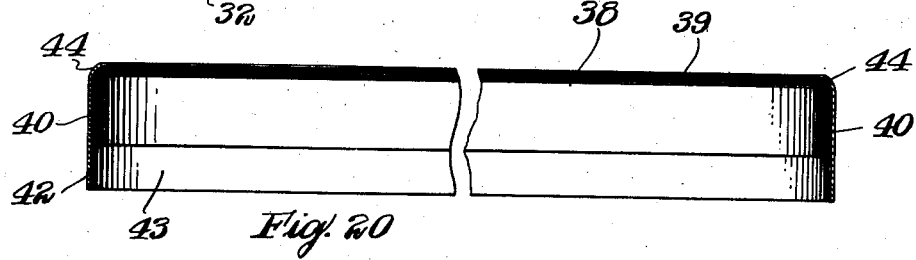
Fig. 20
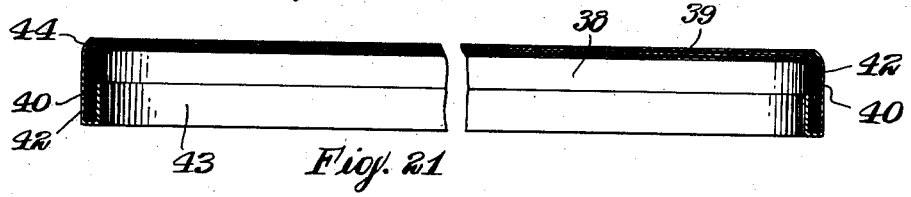
Fig. 21
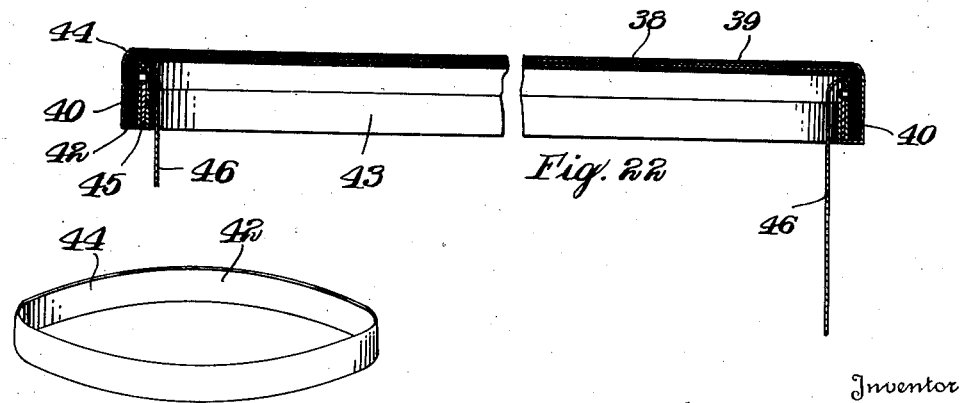
Fig. 22
Fig. 19
Inventor
Alfred R. Metzger
By Howard Fischer
Attorney April 18, 1939. A. R. METZGER 2,154,691
METHOD OF MAKING CONTAINERS
Filed Feb. 15, 1934 5 Sheets—Sheet 5

Inventor
Alfred R. Metzger
By Howard Fischer
Attorney

Patented Apr. 18, 1939

2,154,691

UNITED STATES PATENT OFFICE 2,154,691

METHOD OF MAKING CONTAINERS

Alfred R. Metzger, White Bear Lake, Minn., assignor of one-half to David C. Shepard, St. Paul, Minn.

Application February 15, 1934, Serial No. 711,437

18 Claims. (Cl. 93—39.1)

My invention relates to an improvement in the method of making containers, where it is desired to form containers of the type particularly adaptable for use for lard, butter or any dry or semi-liquid substance for shipping purposes.

Many experiments have been made in an attempt to find a practical method of forming laminated paper containers. The previous methods with which I am familiar have proven costly and impractical, and the containers formed have not been able to withstand the strain which necessarily must be placed upon such containers in shipping and handling.

By my method I have been able to provide laminated paper tubs which are capable of withstanding much greater strain than can be stood by wooden tubs which are often used for much the same purposes. The containers formed by my method are lighter in weight than such wooden containers, and are more easily sealed. Furthermore, I have been able to provide waterproof and greaseproof containers capable of holding a liquid or a semi-liquid substance.

It is a feature of my method that the product formed may be readily reconditioned and put into perfect shape for re-use at a low cost, permitting the use of the containers a number of times. This is of particular advantage to shippers, as previously containers of this nature have been incapable of standing up under continued use.

It is also a feature of my method that the product formed may be nested together when it is desired to ship the containers empty. This permits a large number of my containers to be contained in a minimum of space when not filled, and may be conveniently stored in a small storage space.

It is the object of my invention to provide a laminated container which is thicker at the points of strain than at other points. The walls of my containers are reinforced by added thickness at points where the most strain is transmitted. In this manner I have been able to keep the weight of the container at a minimum and the strength thereof at a maximum.

It is also a feature of my invention to provide a means of forming reinforcing hoops of laminated paper simultaneously with the formation of the body of the containers, thus obviating the necessity of separate steps of forming such reinforcing hoops. These hoops may be formed at the same time the body of the container is trimmed, thus forming additional parts simultaneously with the necessary step of trimming the container body. By giving the body of the container the proper taper, it is possible to cut rings from either end of the body of the container which will nest one within the other and will permit any number of thicknesses of the body to be used for reinforcing purposes.

It is also a purpose of my invention to provide a simple means of reinforcing the cover of my container. The cover reinforced by this simple means is capable of withstanding heavy strain, and yet can be made inexpensively and easily. This cover, as well as the bottom of the container, are preferably made of laminated paper, providing a light, waterproof and extremely strong top and bottom construction.

These and other features and objects of my invention will be more fully and clearly set forth in the following specification and claims.

In the drawings forming a part of my specification:

Figure 5 illustrates the manner of securing the outer covering sheet to the first filler sheet, after glue has been applied to these sheets.

Figure 6 shows the manner of applying the second filler sheet to the glued combination shown in Figure 5.

Figure 7 shows the third filler sheet added to the glued combination shown in Figure 6.

Figure 8 shows the manner in which a fourth filler sheet could be added to the combination shown in Figure 7.

Figure 9 illustrates the inner covering sheet secured to the glued combination shown in Figure 8. It can be noted that the inner covering sheet is not provided with a coating of glue.

Figure 10 illustrates the combination shown in Figure 9 after it has been rolled on a mandrel.

Figure 11 illustrates the manner of cutting the body shown in Figure 10 to provide a body portion and a number of reinforcing hoops.

Figure 12 illustrates the nested hoops cut from the larger end of the body shown in Figure 11.

Figure 13 illustrates a series of hoops cut from the smaller end of the body as shown in Figure

11, the hoops being nested one within the other.

Figure 14 illustrates a blank of laminated paper to be used for forming the tops and bottoms of the container.

Figure 15 illustrates a container bottom after it has been cut from the blank in Figure 14 and formed with side walls.

Figure 16 illustrates the container bottom of Figure 15 reinforced by the nested hoops shown in Figure 13.

Figure 17 shows the body portion of the container formed as shown in Figure 11, with the nested hoops cut from the larger end thereof being forced up flush with the upper edge of the container, and the bottom formed as shown in Figure 16 being forced down into place within the container.

Figure 18 illustrates the cover of the container formed from a blank as shown in Figure 14, after having been cut and pressed into shape.

Figure 19 illustrates a metal reinforcing hoop used for reinforcing the peripheral edge of the cover.

Figure 20 illustrates the cover of Figure 18, with the hoop as shown in Figure 19 in position thereupon.

Figure 21 illustrates the hoop of Figures 19 and 20 after it has been bent over to bind the edge of the cover.

Figure 22 illustrates a second reinforcing band in place within the edge of the cover, having cover attaching straps attached thereto.

Figure 23:
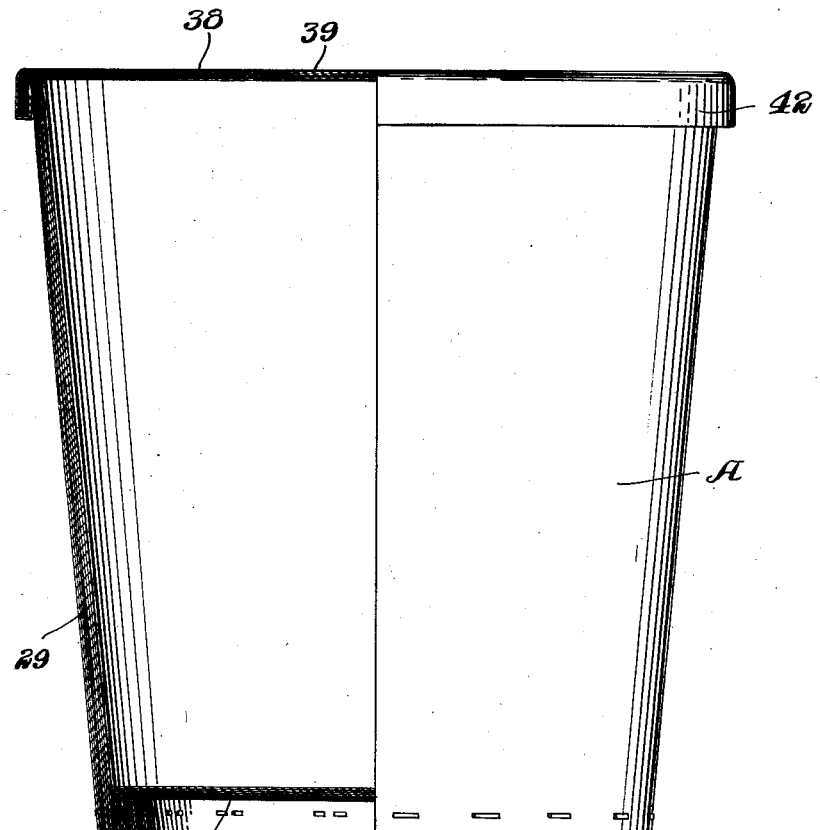

Figure 23 illustrates in partial cross section a complete tub with cover in place, not embodying, however, the upper reinforcing hoops on the body.

Figure 24:
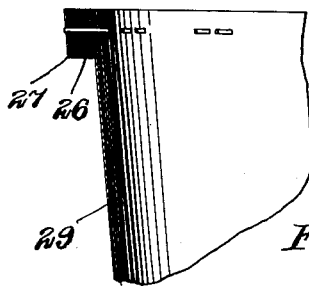

Figure 24 illustrates a detail cross sectional view of the upper edge of the container with the reinforcing hoops in position.

My containers A are formed of blanks cut from continuous sheets of paper or other suitable material. The entire tub or container A may be formed from a single type of paper or other material, or the inner and outer covering sheets may be of a more desirable appearance than could be used for filler sheets. It is obvious that one or two of the blanks could be formed of different material to provide a stronger tub, if desired.

Figure 1:
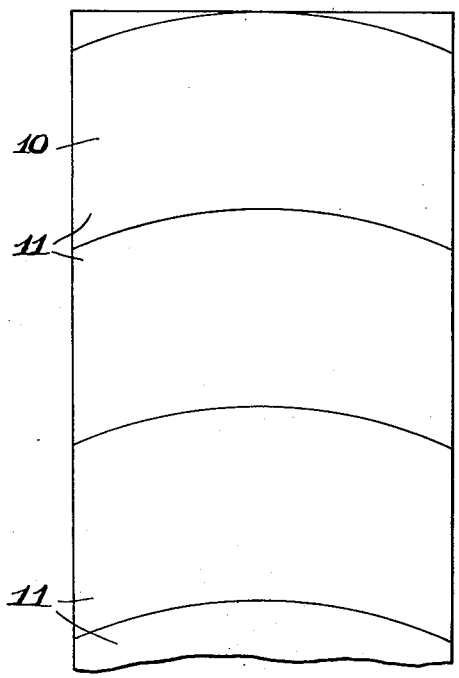
Figure 1 illustrates a sheet of paper used for the inner and outer sheets of my container.

For the purpose of illustration, I have shown in Figure 1, a sheet 10 of covering material having a fine appearance to be used for the inner and outer covering sheets. The sheet 10 is cut by a suitable cutter along arcuated lines, dividing the sheet into blanks 11 having parallel side edges and arcuated top and bottom edges. The arc cut is preferably the arc necessary to form a square top edge when the container is rolled. It is not necessary that the bottom edge 12 be cut along its proper arc to provide a flat bottom, as this portion of the tub or container A may be cut away when the same is trimmed.

Figure 2:
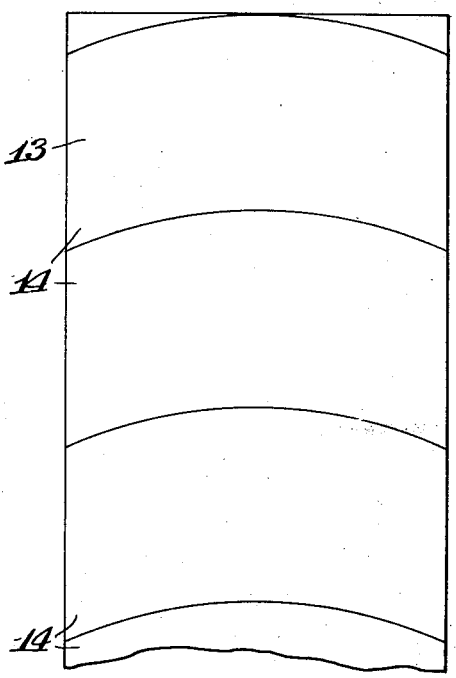
Figure 2 illustrates a sheet similar to that of Figure 1, but which is used for providing the intermediate or filler sheets of the container.
Figure 3:
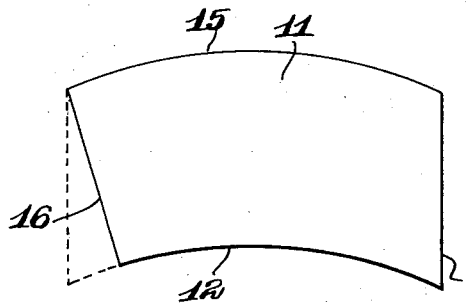
Figure 3 illustrates the manner of cutting the sheets shown in Figure 1 to form the blanks for the inner and outer sheets.
Figure 4:
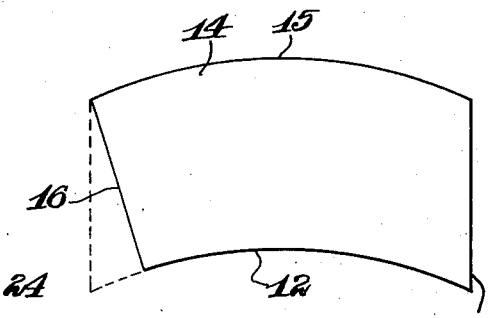
Figure 4 shows the manner of cutting the sheets shown in Figure 2 to form the blanks used for the intermediate or filler sheets.

Figure 2 shows a sheet of paper or other suitable material 13 which is cut in a manner similar to the formation of the blanks 11, to form filler blanks 14.

In the next step of the process, one edge of each blank 11 or 14 is cut along a radius line from the upper edge 15 thereof to provide an edge extending in a vertical plane when the tub A is complete. This cut is for ascertaining the proper rolling of the tub by presenting a square edge to the mandrel upon which the tubs are rolled. While in some cases this cut might be eliminated, I have found that it usually causes the tub to roll more evenly, and is therefore of assistance in the proper operation of the mandrel. The cutting of the square edge 16 on the blanks 11 and 14 could be combined in a single step if the paper were stamped out into shape.

The blanks are next sent through a gluing machine in proper order to assemble the glued sheets properly to present the same to the mandrel for rolling. The sheets passing through the gluing machine are glued on one side only, and over the entire surface. The outer covering sheet 17 is first received from the gluing machine and placed with the glued side up on an assembling table. A filler sheet 18 is next glued, and placed in overlapping relationship on the assembly table as shown in Figure 5. A second filler sheet, designated 19, is next glued, and laid over the joint between the sheets 17 and 18, as shown in Figure 6. A third filler sheet 20, is dropped upon the sheets 17, 18 and 19 as shown in Figure 7. While three filler sheets is ordinarily sufficient, a fourth sheet may be added, as designated at 22, to the sheets 17, 18, 19 and 20, in the manner illustrated in Figure 8. It is obvious that the desired number of filler sheets may be placed in staggered relationship over the outer covering sheet and first filler sheet 18, each being placed with the glued surface uppermost to cause the superimposed sheets to adhere.

When the desired number of filler sheets have been added, an unglued inner covering sheet 23 is placed in overlapping relationship with the sheets 17 and 22 inclusive, extending somewhat beyond the outermost filler sheet 18. This unglued sheet forms the inner surface of the container A, and contacts with the mandrel, which is not shown, during the rolling of the tub.

The assembled sheets as shown in Figure 9 are then wound upon a mandrel, the edge 16 of the sheet 23 being first wrapped, and the remaining sheets wrapped together so that the sheet 23 is innermost and the sheet 17 is outermost. The glued edges of the various sheets projecting beyond the sheet 23 engage the rear surfaces of inner layers of paper, and the rolled sheets are secured firmly together.

The glue used is a special waterproofing and greaseproofing substance which, when dry, prevents leakage of moisture from the container. Accordingly, the container is provided with a plurality of waterproofed and greaseproofed surfaces through which no moisture and grease can penetrate.

The rolled blanks when removed from the mandrel to dry are of the shape illustrated in Figure 10, but are limp and flexible due to the softening nature of the moist glue upon the paper. The rolling of the containers also stretches the paper somewhat oftentimes, but as each container is rolled a similar number of times, the stretching is controlled, and is similar in each container. It will be noted that the uncut edges 24 of the blanks 11 and 14 cause the blanks to overlap to a greater extent toward the bottom edge thereof than near the top of the container. For this reason, the walls of the tub are slightly thicker at the bottom than at the top. This feature strengthens the tub where it is most needed.

The rolled sheets are placed upon mandrels to dry, or are stacked one within the other so that the sheets are held in place by the next adjacent body of rolled sheets. The sheets shrink somewhat when drying, in usual practice.

When sufficiently dry, the rolled sheets are placed on a cutting mandrel, and rotated while a number of cuts are made, as indicated at 25. The cuts at the larger end of the container separate the top edge of the container from two rings 26 and 27. It is also possible to cut off a small ring of scrap 28 from this top end, but this is usually not necessary as the top edge of the rolled sheets forms a perfect circle. These rings are nested one within the other, as shown in Figure 12, and glued together to provide a reinforcing ring for the top of the tub. In many constructions, the top of the tub needs no reinforcement, in which case the rings 26 and 27 are not cut from the body of the rolled sheets. When the ring 26 is within the ring 27, both rings may be forced up into place flush with the upper edge of the side wall portion 29 of the tub A, in the manner illustrated in Figure 17. The rings may be secured in this position by gluing, or fastening with metal staples as shown in Figure 24, or both methods may be used.

The bottoms of the containers A are formed of a blank of laminated sheets, as designated at 30 in Figure 14. The blanks are glued together, and let stand until partially set. While the paper is still slightly moist, the blanks are placed in a punch press, which first cuts out the bottoms 32 in a circular shape, and then forces the center of the bottoms down to form a bottom member which is flat with integral cylindrical side wall, as shown in Figure 15.

In cutting the rolled sheets on the cutting mandrel, several hoops 33, 34, 35 and 36 are cut from the bottom or smaller edge of the body portion 29. The largest of these hoops, 33, is of the same size as the cylindrical wall 37 of the bottom 32, so this hoop is discarded. The remaining hoops, 34, 35 and 36, are nested one within the other, as shown in Figure 13, and are preferably glued together. The thick hoop thus formed is placed within the side wall 37, as shown in Figure 16, and preferably glued in position. The bottom thus formed is forced downwardly into the body portion 29, as shown in Figure 17, and is secured by gluing or stapling as shown in Figure 23, or by both means combined.

The cover 38 is formed of a blank 30 as shown in Figure 14, by cutting the blank and pressing the same in a punch press to form the shape illustrated in Figure 18, wherein the flat top portion 39 of the cover 38 is edged by cylindrical side wall 40. This cover is reinforced by some means such as the metal hoop 42 shown in Figure 19 which tapers inwardly at the top. This hoop 42 is slid over the side walls 40 of the cover 28 as shown in Figure 20, and the lower projecting edge 43 of this hoop is bent inwardly and up to enclose the edge of the side walls 40. The side walls 40 are thus held securely between the inwardly tapering edge 44 of the hoop and the crimped or bent edge of the same.

If it is desired, the side walls 40 may be further reinforced by means of an inner hoop 45 to which is secured attaching strips 46, as shown in Figure 22. The projecting edge 43 is crimped over this inner hoop 45 as well as the edge of the wall 40, thus holding the inner hoop securely in position.

The entire tub or container A, as well as the cover thereof, is then dipped bodily in a solution of melted paraffin, and the paraffin is allowed to soak into the paper somewhat, as well as into all of the interstices between layers of paper, and joints between the various parts. This provides a waterproof coating which can be renewed at any time, and which protects the surface of the paper against marring or discoloration, and prevents absorption of moisture by the paper.

After a container A has been used for some time, it may be reconditioned by steaming to remove the surface paraffin, and redipping in the paraffin. The new coating enhances the appearance of the finished product, and makes the container suitable for use for a further period of time.

The taper of the tub is such that the same may be readily nested together for shipping empty. The covers may be tied in a separate bundle, and as they are substantially flat, require but little space. Thus the containers may be easily stored in a small space, and may be easily shipped and handled.

I have endeavored to set forth the principles of my method in accordance with the patent statutes, and while I have attempted to set forth the best embodiment thereof, I desire to have it understood that this is only illustrative of a means of carrying out my invention, and that obvious changes may be made within the scope of the following claims without departing from the spirit of my invention.

I claim:

1. A method of forming a container comprising cutting a number of blanks, gluing the same in overlapping staggered relationship while lying flat, and rolling the glued and overlapped sheets.

2. A method of forming a container comprising gluing in overlapping staggered relationship a number of blanks while lying flat, rolling said unitarily secured blanks to form container side walls, and pressing a bottom within the side walls.

3. A method of forming a container comprising securing a number of blanks together in staggered relationship with a waterproof and greaseproof glue, and rolling the staggered sheets upon a mandrel while the glue is still moist to hold the sheets in rolled formation in such a manner that each sheet overlaps itself.

4. The method of forming a container comprising rolling a laminated container wall portion on a mandrel, cutting a body portion from the rolled wall portion, cutting a series of hoops from the rolled wall portion adjacent the top and bottom of the container, nesting the hoops one within the other, and applying said nested hoops to the body portion of the container to reinforce the same.

5. The method of forming a container consisting in rolling a laminated container wall portion on a mandrel, cutting a body portion from said wall portion, cutting hoops from said wall portion, forming a bottom for said container having a circumferential flange, and placing said hoops within said circumferential flange reinforcing said bottom by said hoops.

6. The method of forming a container consisting in rolling a laminated tapered roll, cutting a container body portion from said roll, cutting reinforcing hoops from said roll, forming a laminated paper bottom having side walls thereon, placing one or more of said hoops cut from said roll within said side walls of the bottom to reinforce the same, and forcing said reinforced bottom into position within the body portion.

7. The method of forming a container comprising rolling a tapered laminated roll, cutting a body portion from said roll, cutting hoops from said roll adjacent said body portion just sufficiently wide to permit the hoops to nest one within the other, and securing said nested hoops encircling the body portion to reinforce the same.

8. The method of forming a reinforced container consisting in rolling a laminated paper roll, tapering said roll, cutting the roll to provide a body of truncated cone-shape, cutting truncated conical rings from said roll just wide enough to cause the rings to nest perfectly one within the other, cutting out a bottom of laminated material, forming said bottom to provide side walls, placing some of the rings within the bottom side walls to reinforce the bottom, and forcing the bottom in position within the container.

9. The method of forming a container consisting in cutting blanks, securing said blanks in overlapping relation, rolling said secured blanks in tapered formation, the blanks overlapping to a greater extent along the smaller end of the roll, and securing a bottom to the smaller end of the roll.

10. The method of forming a container comprising cutting blanks, securing said blanks in overlapping relation, rolling said blanks to form a container in which the blanks overlap to a greater extent at one end of the container than at the other, thus forming a container wall which is thicker at one end than at the other.

11. The method of forming a container wall from a number of blanks of paper or similar material, comprising arranging the blanks flat against one another so that they overlap to a greater extent along one side thereof than at the other, and bending said arranged blanks to form the wall.

12. The method of forming a container consisting in rolling a laminated paper side wall portion, stamping out a laminated bottom, securing the bottom to the side wall portion, stamping out a cover to provide a peripheral depending flange thereabout, forming an inwardly extending ring on a reinforcing hoop, sliding the reinforcing hoop over the flange until said inwardly extending ring contacts said cover, and crimping the reinforcing hoop over the flange against the inside of the flange to enclose the lower edge of the flange on the cover.

13. The method of forming a container cover consisting in forming a laminated paper blank, cutting said blank, forming the cut blank to provide a peripheral flange about the cover, sliding a metal reinforcing hoop having an inwardly bent retaining ring on one edge over the peripheral edge, and crimping the other edge of the hoop over the lower edge of the peripheral flange and against the inside thereof to enclose and reinforce the same.

14. The method of forming a container comprising forming a laminated paper blank, cutting the blank, forming the cut blank to provide a peripheral flange about the same, placing an inner reinforcing hoop within said peripheral flange, sliding a reinforcing hoop outside said flange, and crimping the outer reinforcing hoop up over the flange edge and the inner hoop to hold the same in proper position.

15. The method of forming a container cover comprising forming a laminated paper blank, cutting the blank and providing a peripheral flange thereabout, forming a reinforcing hoop with an inwardly extending shoulder along one edge, sliding this hoop over said peripheral flange until the inwardly extending shoulder is adjacent the blank, and bending the other edge of said hoop inwardly to engage said hoop upon said flange.

16. The method of forming the side wall structure of a conical container from a length of paper, which consists in cutting the paper transversely along curved lines to form separate sheets having the same degree of curvature at the top and bottom, and of a curvature such that the edges of the sheets at one end of the formed wall structure will register with one another, in securing the sheets together, in wrapped relation, one upon the other with the registrable edges in register, and in trimming the several sheets of the formed wall structure collectively at the other end of the said wall structure.

17. The method of forming the side wall structure of a conical container from a length of paper which consists in severing separate sheets from the length of paper, each sheet being formed by a single transverse cut along a curved line of a degree of curvature such that the edges of the sheet at one end of the formed wall structure will register with one another, in securing the sheets together in wrapped relation, one upon the other, with said registrable edges in register, and in trimming the several sheets of the formed wall structure collectively at the other end of said wall structure.

18. The method of forming the side wall structure of a conical container from a length of paper which consists in severing separate sheets from the length of paper, each sheet being formed by a single transverse cut along a curved line of a degree of curvature such that the edges of the sheets at the upper end of the formed wall structure will register with one another, in securing the sheets in wrapped relation, one upon the other, with said registrable edges in register, and in trimming the several sheets of the formed wall structure collectively at the bottom end of said wall structure.

ALFRED R. METZGER.